Sept. 15, 1953  R. M. WALKER  2,652,535
HIGH-FREQUENCY TESTING APPARATUS
Filed Jan. 2, 1948

INVENTOR.
Richard M. Walker
BY
Lawrence Brown,
ATTORNEY

Patented Sept. 15, 1953

2,652,535

UNITED STATES PATENT OFFICE 2,652,535

HIGH-FREQUENCY TESTING APPARATUS

Richard M. Walker, Dorchester, Mass., assignor to Sylvania Electric Products Inc., Salem, Mass., a corporation of Massachusetts Application January 2, 1948, Serial No. 219

7 Claims. (Cl. 324—95)

This invention relates to an apparatus for testing high frequency energy flowing in a hollow waveguide system.

In the operation of high frequency apparatus it is vital to the efficient operation of such apparatus that a careful check be maintained upon the power and frequency characteristics of the energy in the system.

It is an object of the invention to provide means for readily checking the power and frequency of energy in a waveguide system.

A further object of the invention is to provide means for extending the range of indication of single indicator members beyond that which it normally indicates.

A further object of the invention is to provide, in an assembled testing apparatus, means for selectively effecting a change in the path of energy flow to or from energy sources and indicator elements.

A further object of the invention is to provide in a testing apparatus a principal unitary element for conducting the energy to be measured and in which the elements for controlling the path of the energy and its volume and intensity are permanently fixed and calibrated.

The invention may be briefly described as follows. A unitary metallic power distributing member is provided within which a system of channels are formed. The channels are dimensioned to correspond to a conventional waveguide and provided with means for connecting them to a source of power, a waveguide system and power and frequency measuring devices in a manner to be described.

Within the channels of the conductor member at least one attenuator device is located and at least two coupling apertures. The couplers are arranged to transfer energy from one channel to another or from one part of a channel to another part.

The distributor member has connected thereto a power source such as an oscillator tube to supply power thereto, and measuring devices to gauge the power. A connection is provided from the distributor to an external waveguide into which power is fed from the oscillator after it is attenuated by coupling apertures and other means within the distributor.

Moreover means are provided to cause power to flow from the external waveguide to the test apparatus in which case the oscillator is detuned.

To provide a better understanding of the invention a particular embodiment thereof will be described and illustrated in the drawings in which.

Figure 1:
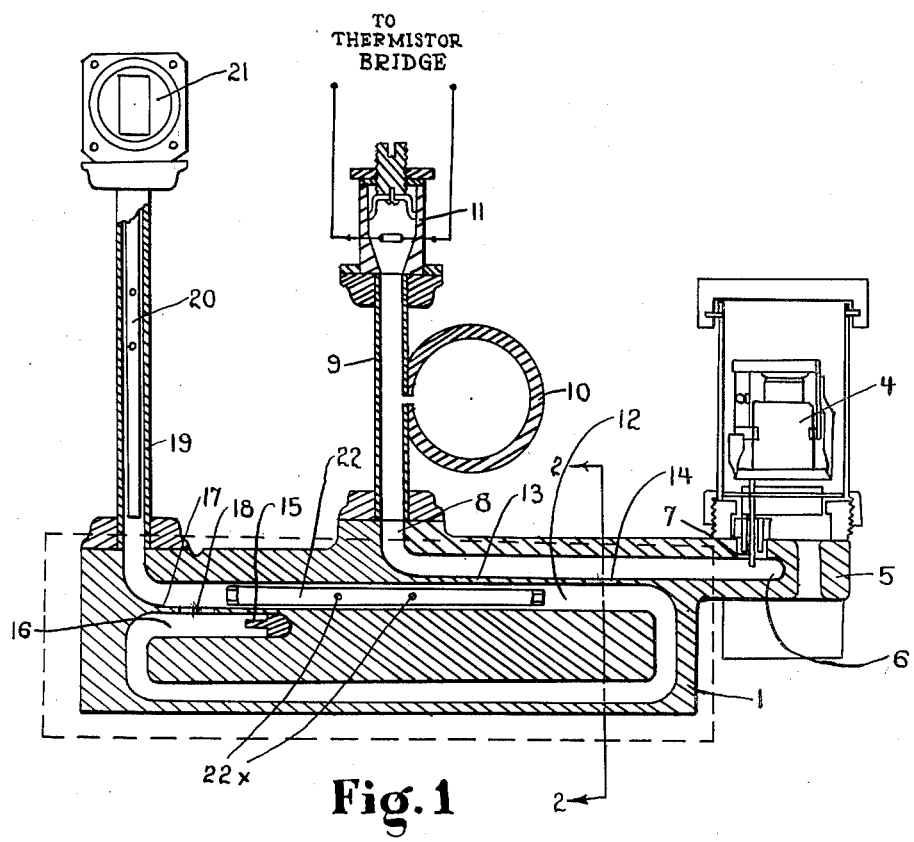
Figure 1 is a longitudinal sectional view of the device.

The conductor member 1 is preferably made of a suitably conducting metal and inasmuch as the member 1 must be provided with a system of channels through which high frequency power flows it can most conveniently be constructed by a moulding operation. To facilitate the moulding operation the member may be formed by moulding the member in two sections 2 and 3 along a substantially longitudinal plane. The two sections are then accurately secured together by soldering, brazing or other means.

The apparatus includes a means for generating high frequency energy such as the oscillator tube 4 which is mounted upon an extension 5 of the conductor member. The output of the tube 4 is fed into a channel 6 in the upper portion of the member 1 by means of an electrode 7 or in any suitable manner. The channel 6 leads to an outlet 8 to which is secured a short section of waveguide 9 having associated therewith a cavity wavemeter 10 of suitable type for measuring microwaves such as the reaction type. A power measuring device is also provided such as the bead thermistor 11 is secured to and receives the power to be measured from the waveguide 9.

Another channel 12 is formed in the member 1 the upper portion of which extends parallel and closely adjacent to the channel 6 for at least a portion of its length. The two channels are therefore separated by a relatively thin wall 13 in which is formed a coupling aperture 14 which desirably is designed to maintain a constant coupling ratio for a substantial change in frequency. A desirable construction for the aperture is that disclosed in my copending application entitled Wide Band High Frequency Coupling Device, Serial No. 793,488.

The channel 12 is shaped in a partial loop and extends from its upper portion downwardly at its right hand and thence horizontally toward the left and upward at the left hand end of the member 1 and thence horizontally toward the right for a short distance where it ends in a conventional termination 15. The left hand horizontal portion 16 of the channel extends parallel to the left hand portion of the upper run of the channel with a thin wall 17 therebetween. Another coupling aperture 18 is formed in the wall 17 similar to the aperture 14. Inasmuch as the apparatus is particularly constructed for testing purposes the coupling apertures are designed to produce a predetermined coupling effect such as 20 decibels of attenuation for each aperture.

The left hand end of the upper run of the channel 12 curves upwardly and opens outwardly into a short section of waveguide 19 secured to the member 1. The waveguide 19 desirably serves as a housing for a calibrated attenuator strip 20 secured in the channel thereof. The upper end of the guide 19 is connected to a waveguide system 21 which may be a part of any high frequency operated apparatus such as a radar set.

Figure 2:
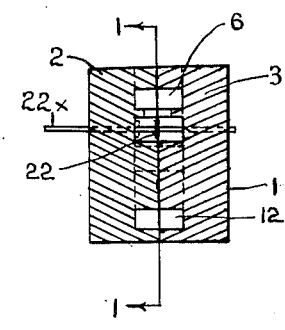
Figure 2 is a cross section taken on line 2—2 Figure 1.

The upper run of the channel 12 desirably has an attenuator bar 22 therein. The bar 22 is supported upon laterally extending wires 22x passing through the distributor. The wires 22x project outward from one side to provide for moving the attenuator laterally in the channel 12 into the dotted position shown in Figure 2 where it becomes substantially ineffective.

In operation power generated by the tube 4 flows into the channels 6 and a small portion is coupled into the channel 12 and substantially all of this power thereof flows to the measuring devices 10 and 11. The coupled component which enters the channel 12 and flows clockwise along the channel 12 reaches the aperture 18 where it is coupled into the left hand end of the upper run of the channel 12. From here it enters the waveguide system 21 flowing through the channel 19. The indicated power level is measured by a suitable thermistor bridge circuit connected to the bead thermistor 11. This indicated power level is reduced between the oscillator and the calibrated attenuator 20 by an amount determined by the attenuation introduced by the coupling apertures 14 and 18 which preferably should be 40 decibels or some known amount. The power reaching the waveguide 21 is therefore determined by calculation from the actual meter reading and the impedance offered by the couplers and the setting of the calibrated attenuator 20. Power which leaks the wrong way at coupler 14 is absorbed by the attenuator 22. While power flowing the wrong way at the coupler 18 is absorbed by the same attenuator. This termination 15 absorbs the power which flows past the input side of the coupler 18.

The frequency of the power is measured by the wavemeter 10 which is adjustable and calibrated in the conventional manner. It is adjusted until a dip in power level is indicated on the power meter in the thermistor bridge in the conventional manner.

An important advantage of the present invention is its ability to also measure the power level and frequency of an external oscillator located at some point in the waveguide system 21. In this case the attenuator 22 is set for minimum attenuation such as the dotted position in Figure 2 which may be approximately .2 decibel. In making this measurement the oscillator tube 4 is detuned and power passing through the coupler 18 and the channel 12 becomes ineffective but the low attenuation of the member 22 permits power to flow directly through the upper run of the channel from left to right from where it is coupled through the aperture 14 into the channel 6 and thence to the indicating elements 10 and 11. It will thus be seen that one set of measuring elements are used for making measurements under both sets of conditions above described.

What I claim is:

1. In combination with a hollow external waveguide system, testing apparatus for high frequency power connected to said system comprising, a metallic power distributor element, a pair of waveguide channels therein each having an outlet connection, a high frequency generator having its output arranged to feed power to a first channel of said distributor, electrical measuring means connected to the outlet of said first channel, said second channel being generally in the form of a flat loop having upper and lower spaced runs connected at one end to its outlet connection, at least a portion of its upper run lying close and parallel to said first channel, a coupling aperture between the first and second channels at their parallel portions, a waveguide connected as a continuous waveguide extension of the remaining end of said lower run and leading upward and thence parallel and close to a portion of the upper run thereof, a second coupling aperture between the extension of the lower run and the adjacent portion of the upper run of said second channel, and interconnecting means connecting the outlet of said second channel to the external waveguide system.

2. A testing apparatus having the elements defined in claim 1 together with an adjustable attenuator means in the upper run of said second channel between the first and second coupling apertures.

3. A testing apparatus having the elements defined in claim 2 together with a termination in the end of the said extension of the lower run of the second channel.

4. A wave-guide system comprising means for connecting an oscillator to an output system and to electrical measuring means, and for alternatively connecting the output system to the measuring means, said system comprising a first length of waveguide having spaced-apart apertures for separating attaching the oscillator and the measuring means, a second length of wave guide having an output aperture for attaching the output system, two directional couplers, said second length of wave guide interconnecting said two directional couplers in series between the output aperture and an intermediate point in the first length of wave guide, a shunt wave guide extending continuously from said output aperture to the directional coupler connected to the first length of wave guide at the side of that directional coupler opposite the first length of waveguide, the directional couplers being so arranged as to transmit signal energy from the oscillator through both couplers in series to the output system or to transmit energy from the output system principally to the electrical measuring means, and an attenuator in said shunt wave guide shiftable laterally into position inhibiting leakage energy from the first coupler from reaching the output system without traversing the second coupler, and for removal from effective position to promote energy transmission from the output system to the measuring device.

5. A wave-guide system for selectively establishing directional transmission paths from a first aperture to a second aperture and to a third aperture or from the third aperture to the second with predetermined different degrees of attenuation, said system comprising a first wave guide between the first and second apertures, a directional coupler in said first wave guide between said apertures, a pair of wave guides extending from said directional coupler to the third aperture, one of said wave guides establishing a direct path and the other establishing a path through a second directional coupler, and an attenuator laterally shiftable selectively into active position or inactive position positioned between said directional couplers in the direct wave-guide path between the first directional coupler and the third aperture.

6. A wave-guide system for transmitting signal energy between a first and a second aperture directly and between the first aperture and a third aperture with predetermined attenuation, and for transmitting signal energy from the third to the second aperture with a predetermined different degree of attenuation, comprising a wave-guide path between the first and the third aperture incorporating two directional couplers in series, a shunt section of wave guide extending continuously from the third aperture to that directional coupler nearer the first aperture at the side of that directional coupler that is more remote from said first aperture, and a selectively operable attenuator in said shunt section of the wave-guide.

7. A wave-guide system comprising a first wave-guide path between first and third terminals and incorporating two directional couplers in series, a direct section of wave guide between said first terminal and a second terminal, and a shunt length of wave-guide constituting a direct path from the third terminal to one of said directional couplers bypassing the other of said directional couplers.

RICHARD M. WALKER.

References Cited in the file of this patent

UNITED STATES PATENTS

| Number | Name | Date |
| --- | --- | --- |
| 2,204,179 | George | June 11, 1940 |
| 2,265,637 | Ferris | Dec. 9, 1941 |
| 2,434,334 | Shepard | Jan. 13, 1948 |
| 2,434,610 | Feiker | Jan. 13, 1948 |
| 2,473,274 | Bradley | June 14, 1949 |
| 2,478,317 | Purcell | Aug. 9, 1949 |
| 2,549,385 | Rapuano | Apr. 17, 1951 |